United States Patent
Schilling et al.

(10) Patent No.: US 7,438,301 B2
(45) Date of Patent: Oct. 21, 2008

(54) APPARATUS AND METHODS FOR MOVING STORAGE AND DISPLAY SYSTEMS

(75) Inventors: Harry Erich Schilling, Steger, IL (US); Phillip Rosenband, Hammond, IN (US)

(73) Assignee: L&P Property Management Company, South Gate, CA (US)

( * ) Notice: Subject to any disclaimer, the term of this patent is extended or adjusted under 35 U.S.C. 154(b) by 384 days.

(21) Appl. No.: 11/051,991

(22) Filed: Feb. 4, 2005

(65) Prior Publication Data

US 2005/0225047 A1 Oct. 13, 2005

Related U.S. Application Data

(60) Provisional application No. 60/542,518, filed on Feb. 6, 2004.

(51) Int. Cl.
*B60P 3/00* (2006.01)
*B60P 1/00* (2006.01)
*B60P 1/02* (2006.01)

(52) U.S. Cl. .................. 280/79.7; 280/47.3; 280/47.23; 280/47.29; 280/47.315; 280/47.15; 280/79.11; 414/458; 414/471; 414/490; 414/495; 414/623

(58) Field of Classification Search ................ 280/79.7, 280/47.3, 47.23, 47.29, 47.315, 47.15, 79.11; 414/458, 471, 490, 495, 622, 623
See application file for complete search history.

(56) References Cited

U.S. PATENT DOCUMENTS

| | | | |
|---|---|---|---|
| 530,437 A * | 12/1894 | Mason | .......................... 280/35 |
| 2,010,490 A * | 8/1935 | Jones | .......................... 254/8 R |
| 2,785,814 A | 3/1957 | Corley | |
| 3,195,859 A | 7/1965 | Jackson et al. | |
| 3,327,996 A | 6/1967 | Morse | |
| 4,037,851 A | 7/1977 | Romero | |
| 4,275,982 A | 6/1981 | Fisco | |
| 4,471,971 A | 9/1984 | Keesler | |
| 4,491,452 A | 1/1985 | Matovich | |
| 4,516,901 A | 5/1985 | Riedl | |
| 4,611,816 A * | 9/1986 | Traister et al. | ............. 280/43.2 |
| 4,623,125 A * | 11/1986 | Ebey | .......................... 254/420 |
| 4,699,391 A | 10/1987 | Syring | |
| 4,712,966 A | 12/1987 | Gross | |
| 4,716,186 A * | 12/1987 | Portnoy et al. | .............. 414/458 |
| 4,913,614 A | 4/1990 | O'Rarden | |
| 4,921,264 A | 5/1990 | Duffy | |
| 4,934,893 A | 6/1990 | Johnson | |
| 5,044,864 A | 9/1991 | Stefan | |
| 5,193,828 A | 3/1993 | Benvenuti | |
| 5,417,539 A | 5/1995 | van der Wal | |
| 5,716,186 A | 2/1998 | Jensen et al. | |

(Continued)

*Primary Examiner*—Christopher Ellis
*Assistant Examiner*—John R Olszewski
(74) *Attorney, Agent, or Firm*—Michael Best & Friedrich LLP (57) ABSTRACT

An apparatus and methods for moving a shelving assembly. The apparatus includes support legs that are connected to the shelving assembly. Jack assemblies are connected to the support legs and are moveable to engage the ground and lift the shelving assembly off the ground. The jack assemblies include wheels so that, when lifted off the ground, the shelving assembly can be moved over the ground with the moving apparatus attached to it.

15 Claims, 12 Drawing Sheets

U.S. PATENT DOCUMENTS

| | | | |
|---|---|---|---|
| 5,782,600 A | 7/1998 | Walsh | |
| 5,924,168 A | 7/1999 | Webb et al. | |
| 5,927,731 A * | 7/1999 | Clarke | 280/79.7 |
| 6,095,533 A * | 8/2000 | Balolia | 280/35 |
| 6,095,537 A | 8/2000 | Cozza et al. | |
| 6,213,491 B1 * | 4/2001 | Southard, Jr. | 280/475 |
| 6,302,381 B1 * | 10/2001 | Roll | 254/425 |
| 6,371,496 B1 * | 4/2002 | Balolia | 280/35 |
| 6,575,481 B1 * | 6/2003 | Davis | 280/47.17 |
| 6,644,626 B2 * | 11/2003 | Baril | 254/2 R |
| 6,766,914 B1 * | 7/2004 | Rios | 211/133.4 |
| 2001/0008344 A1 | 7/2001 | Lanciaux, Jr. | |
| 2001/0048055 A1 * | 12/2001 | Baril | 248/188.1 |

* cited by examiner

APPARATUS AND METHODS FOR MOVING STORAGE AND DISPLAY SYSTEMS

CROSS-REFERENCE TO RELATED APPLICATIONS

Priority is hereby claimed to U.S. provisional patent application No. 60/542,518 filed on Feb. 6, 2004, the entire contents of which are incorporated herein by reference.

FIELD OF THE INVENTION

The present invention relates to apparatuses and methods for moving different types of fixtures and articles and, more particularly to apparatuses and methods for moving storage and display systems such as store shelving assemblies.

BACKGROUND OF THE INVENTION

Many types of product storage and display devices, such as shelves, gondolas, tables, racks, pallets, and other shelving assemblies, exist in today's marketplace for displaying and/or storing products and increasing product storage space. Hereinafter, the terms "shelf," "shelves," and "shelving assembly" refer to any product supporting device, storage device or surface used to support, display or store products.

Such shelves often support heavy product loads, thereby making it difficult to move the shelves. Structural rigidity is important for these shelves, which are typically manufactured with strong, heavy materials such as steel or other metals. Moving such shelving is difficult, whether the shelves are loaded with merchandise or empty.

Shelving assemblies in retail environments are often moved to accommodate ever-changing space requirements and marketing strategies. Moving these shelving assemblies can be performed in a variety of conventional methods. However, limitations and problems exist with many such conventional methods, particularly when the shelves are moved without the aid of any lifting equipment. For example, when manually picking-up the assembled shelves or disassembling the shelves and carrying the disassembled pieces individually, movers may injure themselves or damage the shelves. To try to limit such injuries and damage, the displayed merchandise is often unloaded from the shelves to reduce the weight of the shelving assembly and make it easier for the movers to lift it. However, typically, the shelving assembly is still heavy and difficult to pick up, even after the merchandise is removed. Moreover, manually picking up assembled shelves can take several people and be very time consuming. Disassembling shelving assemblies prior to moving them reduces the potential for injuring movers; however, unloading product from the shelves, disassembling the shelves, moving the shelves, reassembling the shelves, and reloading product onto the shelves is a time-consuming process.

Alternatively, shelving assemblies can be moved with the aid of a variety of mechanical devices. For example, forklifts may be used to move shelves by positioning the forks of the lift under the shelving assembly and lifting it off the ground. However, the shelves may be damaged when sliding the forks underneath them. The shelves may also fall from the forklift if they are not steadily supported on the forks, thereby damaging the shelves or injuring people nearby.

Other mechanical devices used to move display shelving, such as pulley lift systems, typically have either a powered or manual pulley supported on an overhead track and a chain, strap, or other connecting member to connect the pulley to the shelf. Movement of the shelves, however, may be limited by the size and shape of the overhead track.

In light of the limitations and problems of the prior art described above, a need exists for an apparatus that can move shelving assemblies in a time efficient manner, without undue manual labor, and without damaging the shelves. Each embodiment of the present invention achieves one or more of these results.

SUMMARY OF THE INVENTION

In some aspects, the present invention provides a method of moving a shelving assembly. The method includes providing a moving apparatus having a lift member supported by a ground surface, lifting the shelving assembly off the ground surface with the lift member, and moving the shelving assembly relative to the ground surface while the device is supported off the ground by the lift member, the lift member moving along with the product storage/display device.

In some aspects, the present invention provides a method of moving a shelving assembly. The method including providing a moving apparatus including a first support leg having a first lift member and a first ground engaging member connected to the first lift member and engageable with a ground surface and a second support leg having a second lift member and a second ground engaging member connected to the second lift member and engageable with the ground surface. The method further includes connecting the first and second support legs to the shelving assembly, lifting the shelving assembly with the first and second lift members, the shelving assembly being supported on the first and second ground engaging members, and moving the shelving assembly when the shelving assembly is supported on the first and second ground engaging members.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show certain embodiments of the present invention. It should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Figure 1:
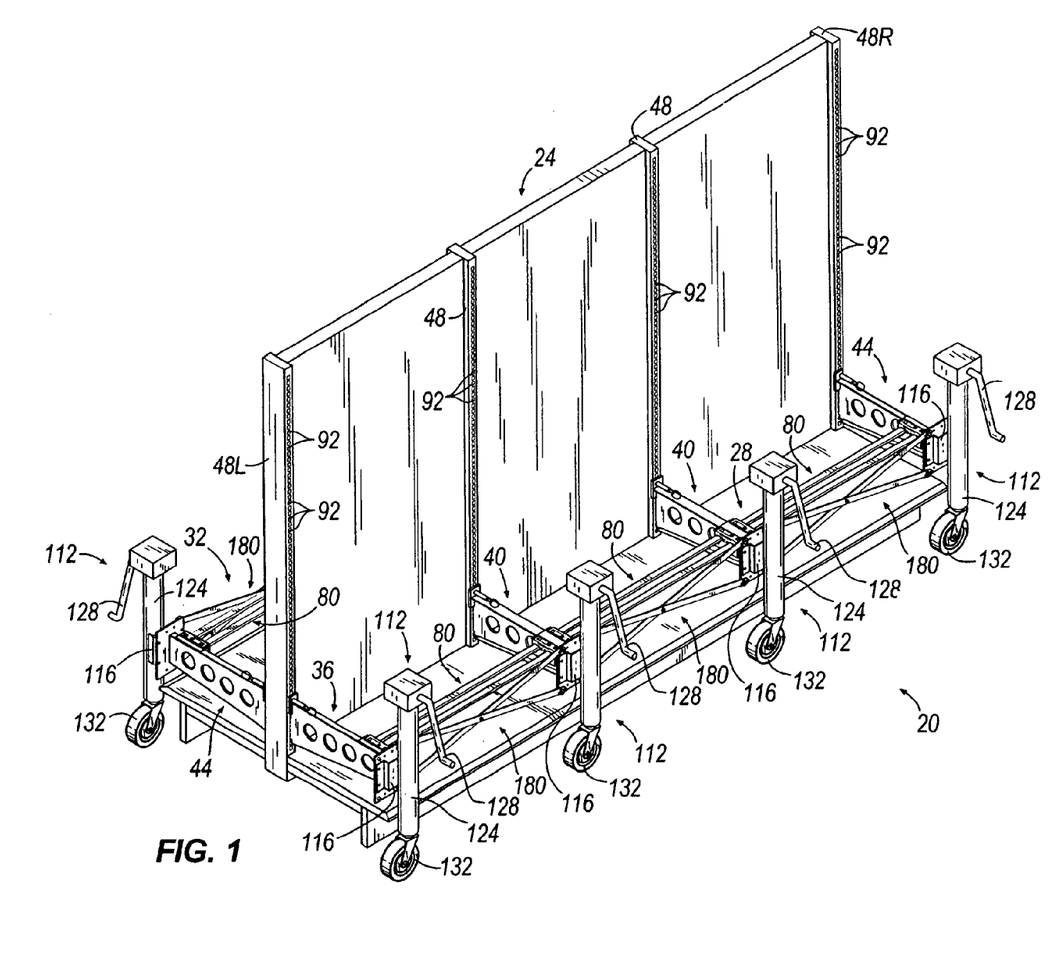
FIG. 1 is a perspective view of the base and attached center support of a product display and storage system or shelving assembly, such as a gondola shelving assembly, with an apparatus for moving the assembly according to an exemplary embodiment of the present invention connected thereto.
Figure 2:
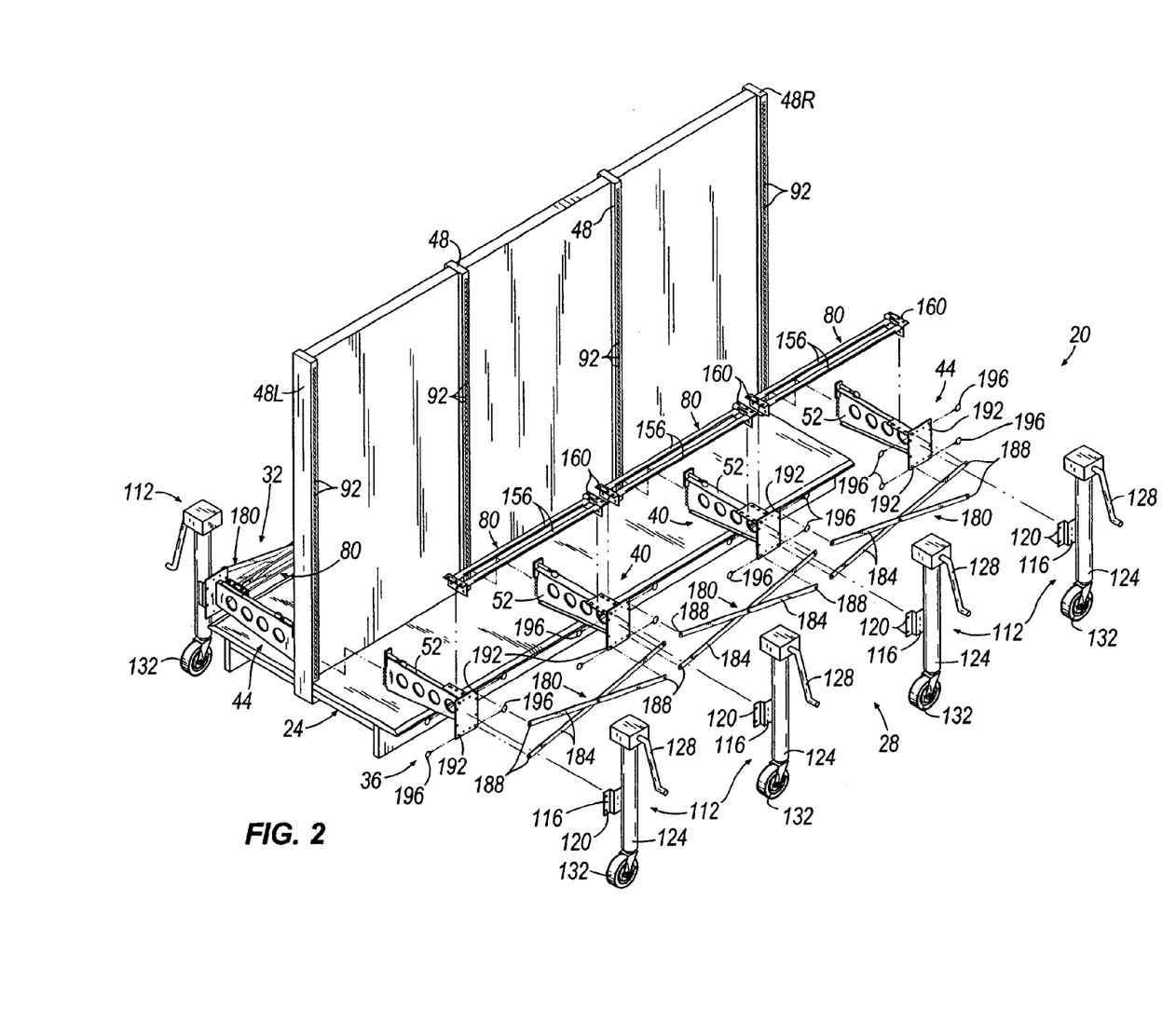
FIG. 2 is a perspective view of the shelving assembly of FIG. 1 and an exploded view of the moving apparatus.

Referring to FIGS. 1 and 2, an exemplary moving apparatus 20 embodying the present invention is illustrated. The moving apparatus 20 is adapted to be connected to a shelving assembly 24 to assist in moving it. In the illustrated embodiment, the shelving assembly 24 is shown as a gondola-type shelf, as will be readily understood by those of ordinary skill in the art. However, the shelving assembly 24 can be any type of shelf or rack system or display or storage system. The moving apparatus 20 can lift the shelving assembly 24 from a stationary mode in which the shelving assembly 24 rests upon a ground surface, to a moving mode in which the shelving assembly 24 is lifted off the ground surface and free to move relative to the ground surface. After the shelving assembly 24 is moved to a desirable location, the moving apparatus 20 can lower the shelving assembly 24 back onto the ground surface to the stationary mode. The moving apparatus 20 is connected to the shelving assembly 24 (see FIG. 1) when the shelving assembly 24 is to be moved and is disconnected and disassembled (see FIG. 2) when the shelving assembly has been moved to its desired location and is to remain stationary in that location. The moving apparatus 20 illustrated in the figures and described in greater detail below is presented by way of example only to illustrate and describe the various features and elements of the present invention.

The terms "front," "back," "right," and "left" will be used in reference to the shelving assembly 24 and the moving apparatus 20 as shown in the figures. These terms are used to conveniently refer to the shelving assembly 24 as it is oriented in the figures. However, it should be understood that the shelving assembly 24 does not truly have a "front," "back," "left" side, or "right" side, as it is symmetric and these terms depend on the perspective of the viewer.

As viewed in FIGS. 1 and 2, the moving apparatus 20 includes a front portion 28 connectable to a front of the shelving assembly 24 and a rear portion 32 connected to a rear of the shelving assembly 24 that are substantially mirror images of each other about the shelving assembly 24 and operate in a substantially similar manner. Accordingly, for brevity, only the front portion 28 of the moving apparatus 20 will be discussed herein. The moving apparatus 20 includes a plurality of support legs 36, 40, 44 for attachment to the shelving assembly 24. In the embodiment shown, the support legs 36, 40, 44 are connected to vertical uprights 48 of the shelving assembly 24. In the embodiment shown, the moving apparatus 20 includes a left support leg 36, a pair of center support legs 40, and a right support leg 44. In some embodiments, the left, center, and right support legs 36, 40, 44 can be identical. However, in the embodiment shown, the left, center, and right support legs 36, 40, 44 have some differences that will be discussed in greater detail below.

Figure 3:
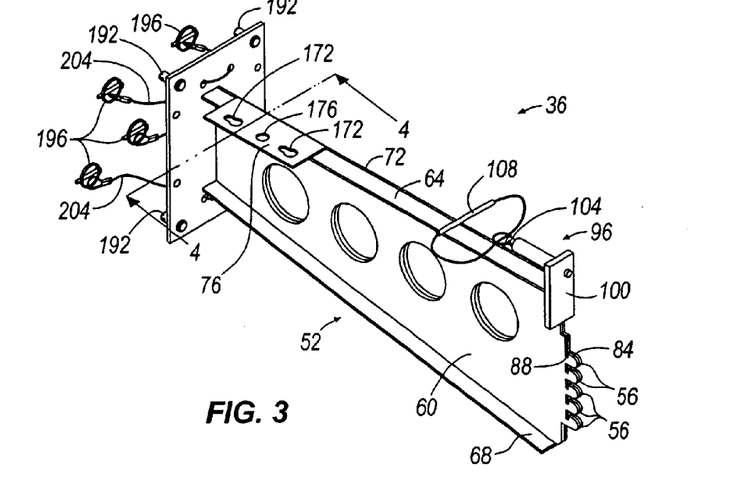
FIG. 3 is a perspective view of a left support leg of the moving apparatus shown in FIG. 1.
Figure 4:
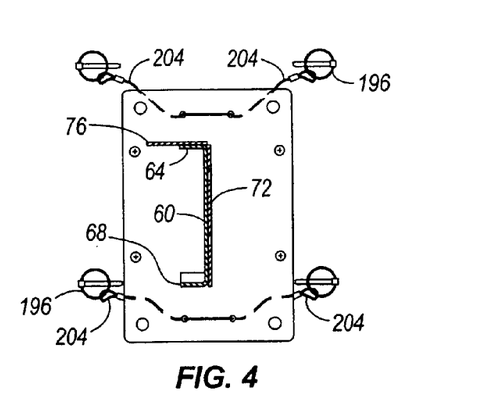
FIG. 4 is a cross-sectional view of the support leg of FIG. 3 taken along line 4-4 in FIG. 3.
Figure 5:
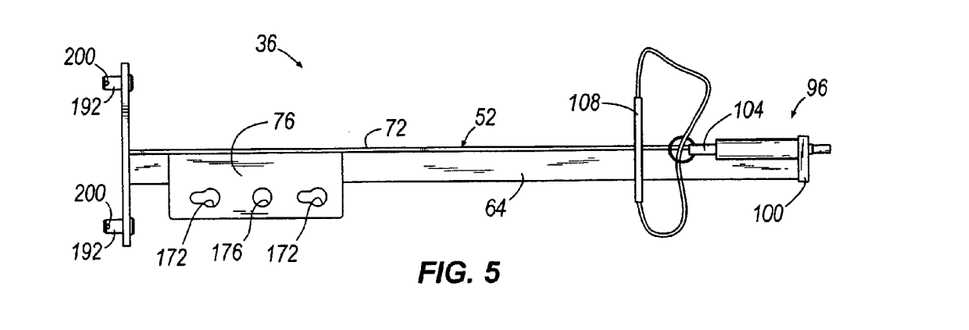
FIG. 5 is a top view of the support leg of FIG. 3.
Figure 6:
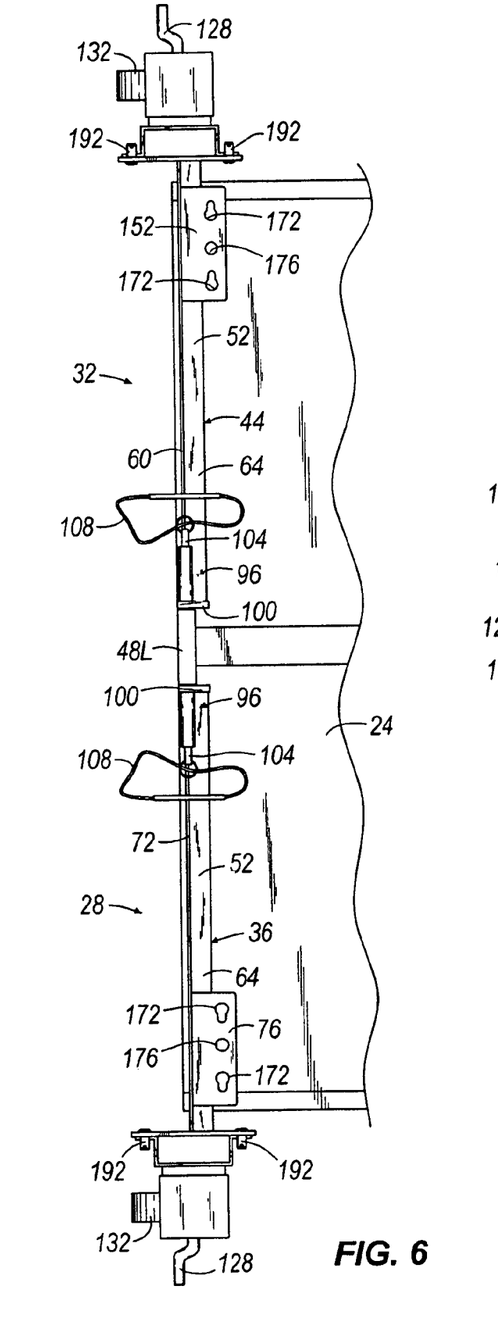
FIG. 6 is a top view with portions broken away of the shelving assembly and the moving apparatus of FIG. 1.
Figure 7:
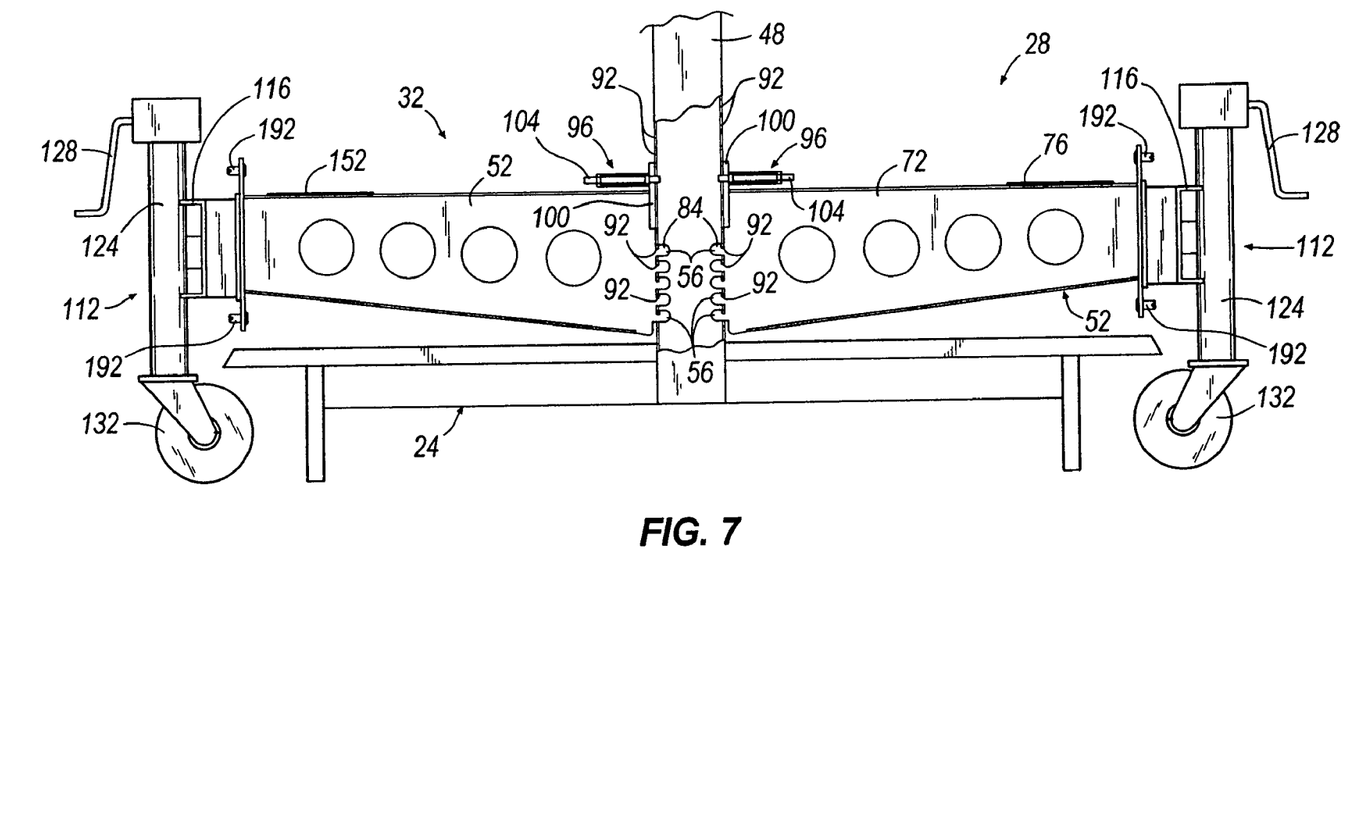
FIG. 7 is a side view of the shelving assembly and moving apparatus of FIG. 6, with portions of a vertical upright of the shelving system broken away, showing connecting tabs of the support leg inserted in upright slots of the vertical upright.

Referring to FIGS. 1-7 and as best seen in FIG. 3, the left support leg 36 includes a body portion 52 having connecting tabs or keys 56 that are engageable with the shelving assembly 24 to connect the left support leg 36 to the shelving assembly 24. Although the body portion 52 can be shaped and manufactured in any manner, the body portion 52 in the embodiment shown includes a first bracket 60 having a top and bottom flange 64, 68 and a second bracket 72 similarly shaped to the first bracket 60 and sandwiched face-to-face with the first bracket 60. In the embodiment shown, the first and second brackets 60, 72 are made of metal and are welded together, however, the first and second brackets 60, 72 can be made of any appropriate material able to withstand the loads produced on them during operation of the moving apparatus 20 and can be connected in any other appropriate manner. Two brackets 60 and 72 are utilized in the illustrated embodiment for strength, but other arrangements, including a single bracket could be used. The left support leg 36 also includes a left strut support 76 welded to the top flange 64 for supporting a crossbar or strut 80 (discussed in greater detail below) and for connecting the strut 80 to the left support leg 36.

Although other types of connecting tabs 56 can be used to connect the left support leg 36 to the shelving assembly 24, each of the first and second brackets 60, 72 in the embodiment shown have complementarily aligned connecting tabs 56 extending from an end thereof. The connecting tabs 56 include a hook portion 84 extending upward to define a capture slot 88 between the hook portion 84 and the first and second brackets 60, 72. The connecting tabs 56 are insertable into slots 92 defined in the vertical uprights 48 of the shelving assembly 24 to engage the vertical uprights 48 (see FIG. 1).

The left support leg 36 also includes a locking assembly 96 to lock the left support leg 36 to the shelving assembly 24 and prevent the left support leg 36 from unintentionally disconnecting from the vertical upright 48 of the shelving assembly 24. Although any type of locking assembly can be utilized to lock the left support leg 36 to the vertical upright 48, the locking assembly 96 in the embodiment shown is a spring-biased locking pin assembly. The locking pin assembly 96 includes a support plate 100 connected to the body portion 52, a spring-biased locking pin 104 biased to an engaging position, and a wire handle or lanyard 108 connected to the pin 104 and graspable by an operator. The locking pin 104 is engageable with an upright slot 92 of the vertical upright 48 to lock the left support leg 36 to the shelving assembly 24 (discussed in greater detail below).

Referring to FIGS. 1-8, the left support leg 36 also includes a lift member or jack assembly 112. In the embodiment shown, the jack assembly 112 includes a jack connecting plate 116 defining a plurality of fastening apertures 120 (see FIGS. 2 and 8) for receiving fasteners to fasten the jack assembly 112 to the body portion 52. Although the jack connecting plate 116 can be connected to the body portion 52 in any appropriate manner, including integrally forming, the jack connecting plate 116 is welded to the body portion 52 of the left support leg 36 in the embodiment shown.

Figure 8:
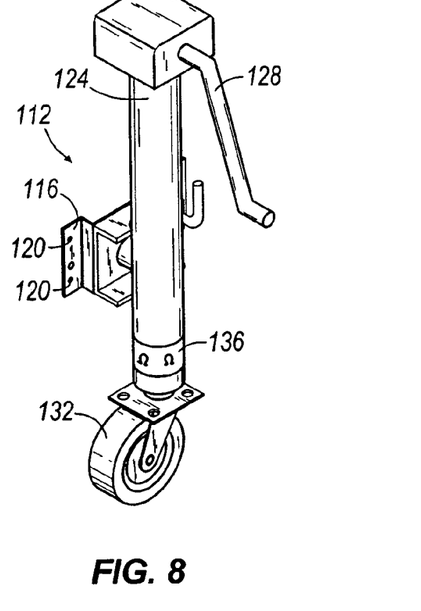
FIG. 8 is a perspective view of a jack assembly of the moving apparatus of FIG. 1.

The jack assembly 112 is adapted to raise and lower the shelving assembly 24 relative to a support surface, such as the ground. Although the jack assembly 112 can be any type of device operable to raise and lower the shelving assembly 24 relative to the ground, the jack assembly 112 in the embodiment shown includes a jack 124 having a handle 128 rotatable by an operator to raise and lower the jack 124 relative to the ground and a wheel or caster 132 connected to the bottom of the jack 124 for moveably supporting it on the ground. In some embodiments (not shown), a ski or sliding member may be provided at the bottom of the jack 124 to allow the shelving assembly 24 to slide over the ground. Alternatively (also not shown), the jack assembly 112 may be pneumatically powered or include a manual pump handle to raise the jack 124 and a pressure valve to release air from the jack 124 and to lower it.

With continued reference to FIGS. 1-8, the jack assembly 112 includes a location indicator 136 (see FIG. 8) for indicating the proper location on the shelving assembly 24 in which to connect the left support leg 36. In this case, the location indicator 136 is shown on the jack assembly 112 of the left support leg 36. However, the indicator 136 could be on any of the various components of the left support leg 36, such as the body portion 52. In the illustrated embodiment, the left support leg 36 is attached to the body portion 52 before a user of the moving apparatus 20 attempts to attach the moving apparatus 20 to the shelving assembly 24. In this way, the location indicator 136 on the jack assembly 112 corresponds to the location in which the particular body portion 52 connected to the jack assembly 112 is to be placed. The indicators 136 can be any type of indicator adapted to indicate the proper connecting location of the left support leg 36 (or any of the other support legs discussed below) and can be positioned anywhere on the support leg 36. The indicators 136 in the embodiment shown are positioned on the jack assembly 112 and include words indicating the proper connecting location.

With particular reference to FIGS. 1 and 3-5, the body portion 52 of the left support leg 36 does not substantially extend (or extend at all) beyond the left edge of the shelving assembly 24. In the embodiment shown, the left support leg 36 has a substantially flat side that does not substantially protrude beyond the left edge of the shelving assembly 24 when the left support leg 36 is connected to the shelving assembly 24, thereby eliminating any interference between the left support leg 36 and a shelving assembly situated next to or abutting the shelving assembly 24 to which the moving apparatus 20 is connected. This can best be seen in FIG. 1, where the flat side of the body portion 52 of the left support leg 36 is facing forward. In FIG. 3, the left support leg 36 is rotated approximately 180° from the view shown in FIG. 1 and the flat side of the left support leg 36 is facing away. In the embodiment shown, the second bracket 72 of the body portion 52 does not have top and bottom flanges extending therefrom and the left strut support 76 does not extend beyond the second bracket 72. Although the left support leg 36 is constructed to avoid portions extending beyond the edge of the shelving assembly 24, the support leg 36 may extend beyond the edge and still fall within the spirit and scope of the invention.

Referring to FIGS. 1-2 and 8-11, the pair of center support legs 40 of the moving apparatus 20 are to be connected to the vertical uprights 48 of the shelving assembly 24. The moving apparatus 20 can include any number of center support legs 40 to effectively support a shelf 24. The moving apparatus 20 in the embodiment shown includes a number of center support legs 40 equal to the number of vertical uprights 48 between the left end and right end vertical uprights 48L, 48R. For example, if a shelf includes a three-vertical-upright or a five-vertical-upright configuration, the moving apparatus 20 would include left and right support legs 36, 44 connected to the left end and right end vertical uprights 48L, 48R, respectively, in both configurations, and one center support leg 40 in the three-vertical-upright configuration and three center support legs 40 in the five-vertical-upright configuration. In the embodiment shown, the shelf 24 includes four vertical uprights 48 with the left support leg 36 connected to the left end vertical upright 48L, the right support leg 44 connected to the right end vertical upright 48R, and the remaining two middle vertical uprights 48 each having a center support leg 40 connected thereto.

Figure 9:
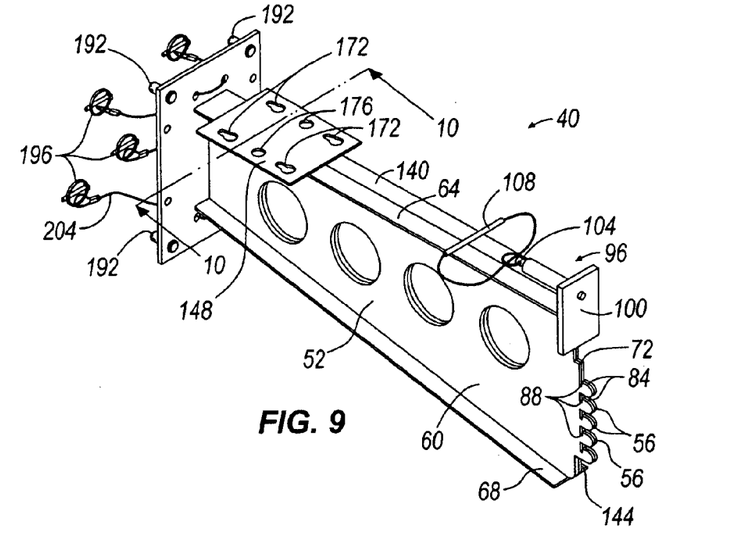
FIG. 9 is a perspective view of a center support leg of the moving apparatus of FIG. 1.
Figure 10:
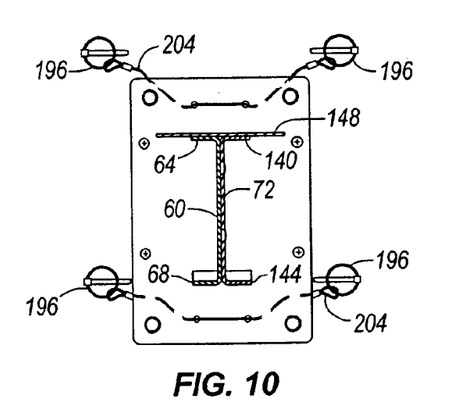
FIG. 10 is a cross-sectional view taken along line 10-10 in FIG. 9.
Figure 11:
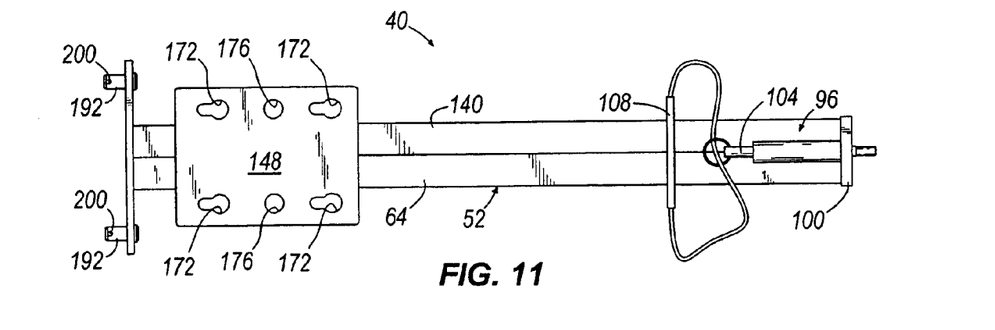
FIG. 11 is a top view of the center support leg of FIG. 9.
Figure 12:
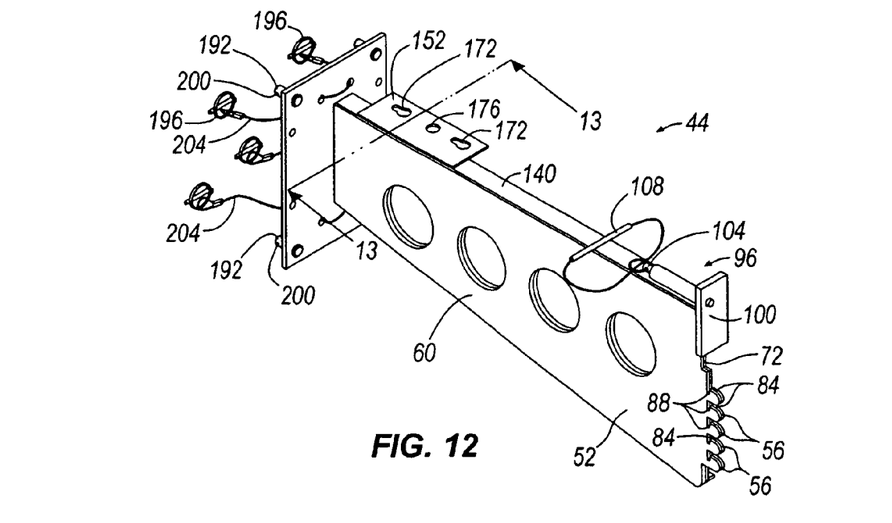
FIG. 12 is a perspective view of a right support leg of the moving apparatus shown in FIG. 1.
Figure 13:
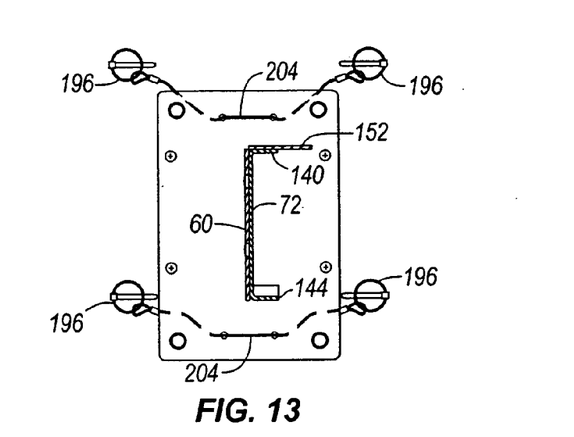
FIG. 13 is a cross-sectional view taken along line 13-13 in FIG. 12.
Figure 14:
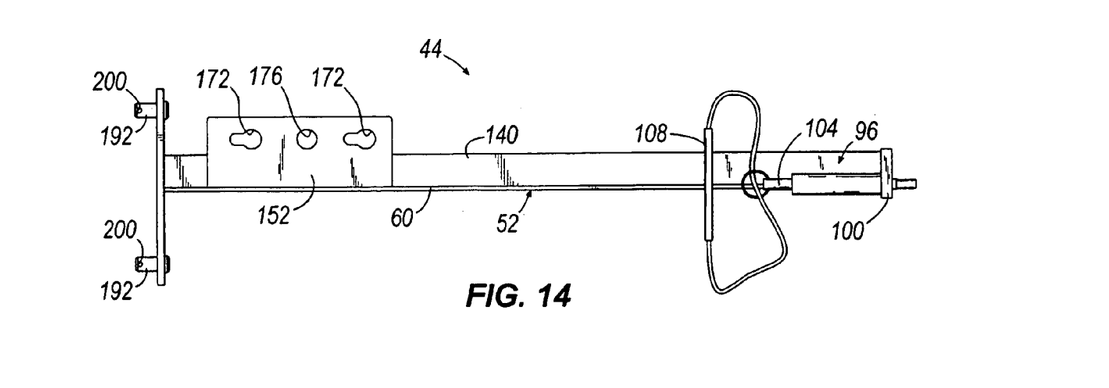
FIG. 14 is a top view of the right support leg shown of FIG. 11.
Figure 15:
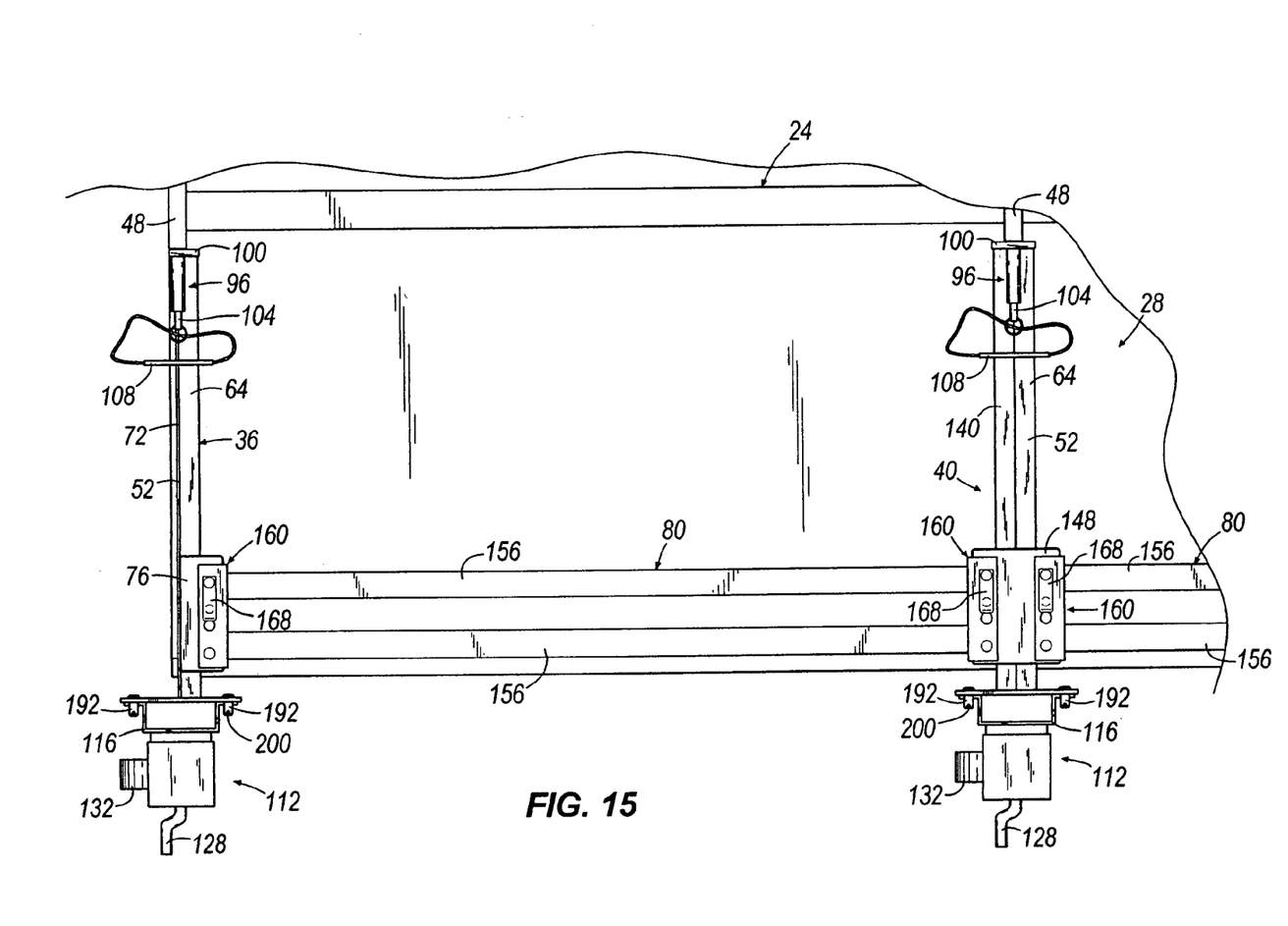
FIG. 15 is a top view with portions broken away of the shelving assembly and the moving apparatus shown in FIG. 1.

The center support legs 40 have similar components, structure, and alternatives to the left support leg 36. Therefore, only those differences between the center support legs 40 and the left support leg 36 will be discussed. Like components have like reference numerals. Also, the pair of center support legs 40 are substantially the same and, therefore, only one of the center support legs 40 will be discussed herein. Like the left support leg 36, the center support legs 40 include top and bottom flanges 64, 68 extending from the first bracket 60. But, in addition, the second bracket 72 of the center support leg 40 also includes top and bottom flanges 140, 144 extending therefrom. Keeping one face of the center support legs 40 flat is not a concern like it is with the left support leg 36 (and, for that matter, the right support leg, as discussed below) because, unlike the left support leg 36, the center support legs 40 are not positioned near an edge of the shelving assembly 24.

The center support legs 40 include a center strut support 148 for supporting struts 80 (discussed in greater detail below) and for connecting the struts 80 to the center support leg 40. Although the center strut support 148 can be connected in any manner to and in any location on the center support leg 40, the center strut support 148, in the embodiment shown, is welded on top of both top flanges 64, 140 of the first and second brackets 60, 72 and extends beyond both top flanges 64, 140.

Referring to FIGS. 1-2 and 12-14, the right support leg 44 of the moving apparatus 20 is connectable to a right vertical upright 48R of the shelving assembly 24. The right support leg 44 has similar components, structure, and alternatives to the left support leg 36 and the center support legs 40; therefore, only those differences between the right support leg 44 and the left and center support legs 36, 40 will be discussed. Like components have like reference numerals. The first bracket 60 of the right support leg 44 does not include a top and bottom flange and the second bracket 72 includes a top and bottom flange 140, 144 for reasons similar to those discussed above with regard to the left support leg 36. The right support leg 44 includes a right strut support 152 for supporting a strut 80 (discussed in greater detail below) and for connecting the strut 80 to the right support leg 44. Although the right strut support 152 can be connected in any manner to and in any location on the right support leg 44, the right strut support 152, in the embodiment shown, is welded on top of the top flange 140 of the second bracket 72 and extends beyond the top flange 140 toward the left support leg 36.

With particular reference to FIGS. 1 and 12-14, the body portion 52 of the right support leg 44 does not substantially extend (or extend at all) beyond the right edge of the shelf 24. In the embodiment shown, the right support leg 44 has a substantially flat side that does not substantially protrude beyond the right edge of the shelving assembly 24 when the right support leg 44 is connected to the shelving assembly 24. As discussed above with reference to the left support leg 36, this limits any interference between the right support leg 44 and a shelving assembly situated next to or abutting the shelving assembly 24 to which the moving apparatus 20 is connected. In the embodiment shown, the first bracket 60 does not have top and bottom flanges extending therefrom and the right strut support 152 does not extend beyond the first bracket 60, thereby providing a flat side of the body portion 52 of the right support leg 44.

It should be understood that the support legs 36, 40, 44 can all assume similar constructions and shapes to one another, rather than distinct constructions as in the embodiment shown. Such similar support legs 36, 40, 44 would not require, although could include, location indicators 136 because any of the support legs 36, 40, 44 could be connected to any of the vertical uprights 48. For example, all of the support legs 36, 40, 44 could have a construction similar to the center support leg 40 construction and have a strut support 148 that extends in both directions from the body portion 52. Such support legs 36, 40, 44, could have a strut 80 connected thereto from both sides, thereby allowing the support legs 36, 40, 44 to be positioned on a center vertical upright 48 to accept two struts 80, on a left end vertical upright 48L to accept a strut 80 from the right, or on the right end vertical upright 48R to accept a strut 80 from the left.

Referring to FIGS. 1-2 and 15-17, the struts 80 of the moving apparatus 20 provide structural rigidity to the moving apparatus 20. Although the struts 80 can be disposed anywhere within the moving apparatus 20, the struts 80 in the embodiment shown are disposed between the support legs 36, 40, 44 and have an end connected to each of two adjacent support legs 36, 40, 44. Any number of struts 80 can be utilized between adjacent support legs of the moving apparatus 20. However, in the embodiment shown, one strut 80 is positioned between each set of consecutive support legs 36, 40, 44.

Figure 16A:
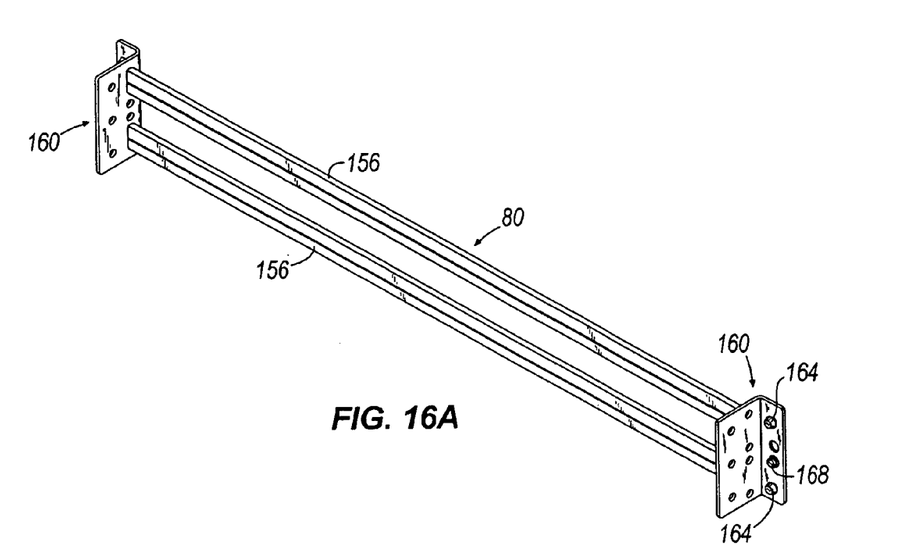
FIG. 16A is a perspective view of a strut of the moving apparatus shown in FIG. 1.
Figure 16B:
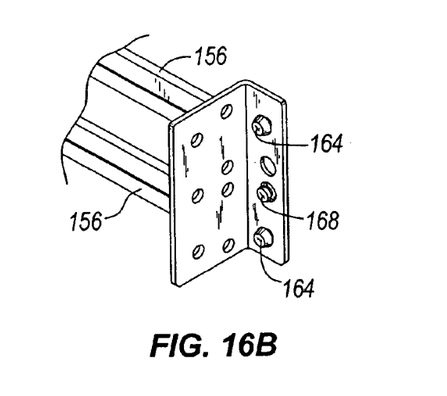
FIG. 16B is an enlarged partial perspective view of the strut shown in FIG. 16A.
Figure 17:
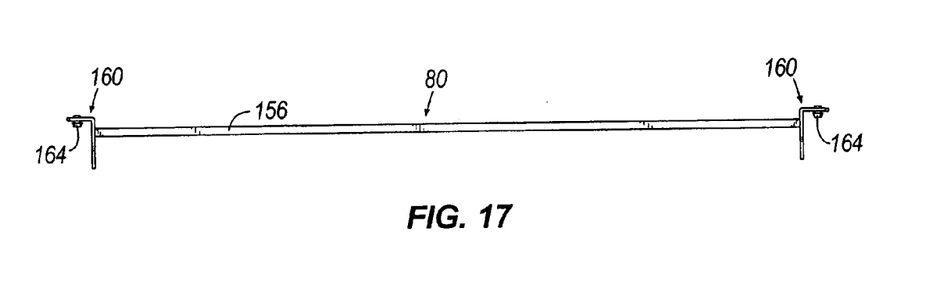
FIG. 17 is a top view of the strut of FIG. 16A.

Although the struts 80 can assume any shape and can be made of any appropriate material, the struts 80 in the embodiment shown are made of steel and include a pair of hollow cross members 156 and a connecting assembly 160 at each end of the pair of cross members 156 (FIGS. 16A, 16B, 17). The struts 80 can be connected to the support legs 36, 40, 44 in any suitable manner; however, in the embodiment shown, the connecting assembly 160 at each end of the cross members 156 includes a pair of projections 164 and a locking tab 168. The projections 164 are insertable into key-hole shaped strut support slots 172 defined in the strut supports 76, 148, 152 (see FIGS. 5, 11, 14).

Various methods and means for locking the struts 80 to the support legs 36, 40, 44 may be utilized, with the struts 80 in the embodiment shown being locked to the support legs 36, 40, 44 by the locking tab 168, which is insertable into a locking aperture 176 defined in the strut supports 76, 148, 152. The locking tab 168 engages the locking aperture 176 (positioned between the two key-hole shaped strut support slots 172) when the projections 164 are inserted into the wide portions of the key-hole shaped strut support slots 172 and then slid laterally into the narrow portions of the key-hole shaped strut support slots 172. Sliding the projections 164 laterally from the wide portions of the key-hole shaped strut support slots 172 to the narrow portions captures the heads of the projections 164 in the support slots 172 and connects the struts 80 to the strut supports 76, 148, 152 of support legs 36, 40, 44. The locking tab 168 is spring-biased downward and inserts into the locking aperture 176 when the projections 164 are captured in the narrow portions of the key-hole shaped strut support slots 172. This prevents the projections 164 from sliding out of the narrow portions of the slots 172 and effectively "locks" the struts 80 to the support legs 36, 40, 44. The locking tab 168 is manually biased upward, out of the locking aperture 176, to unlock and disconnect the struts 80 from the support legs 36, 40, 44.

Figure 18:
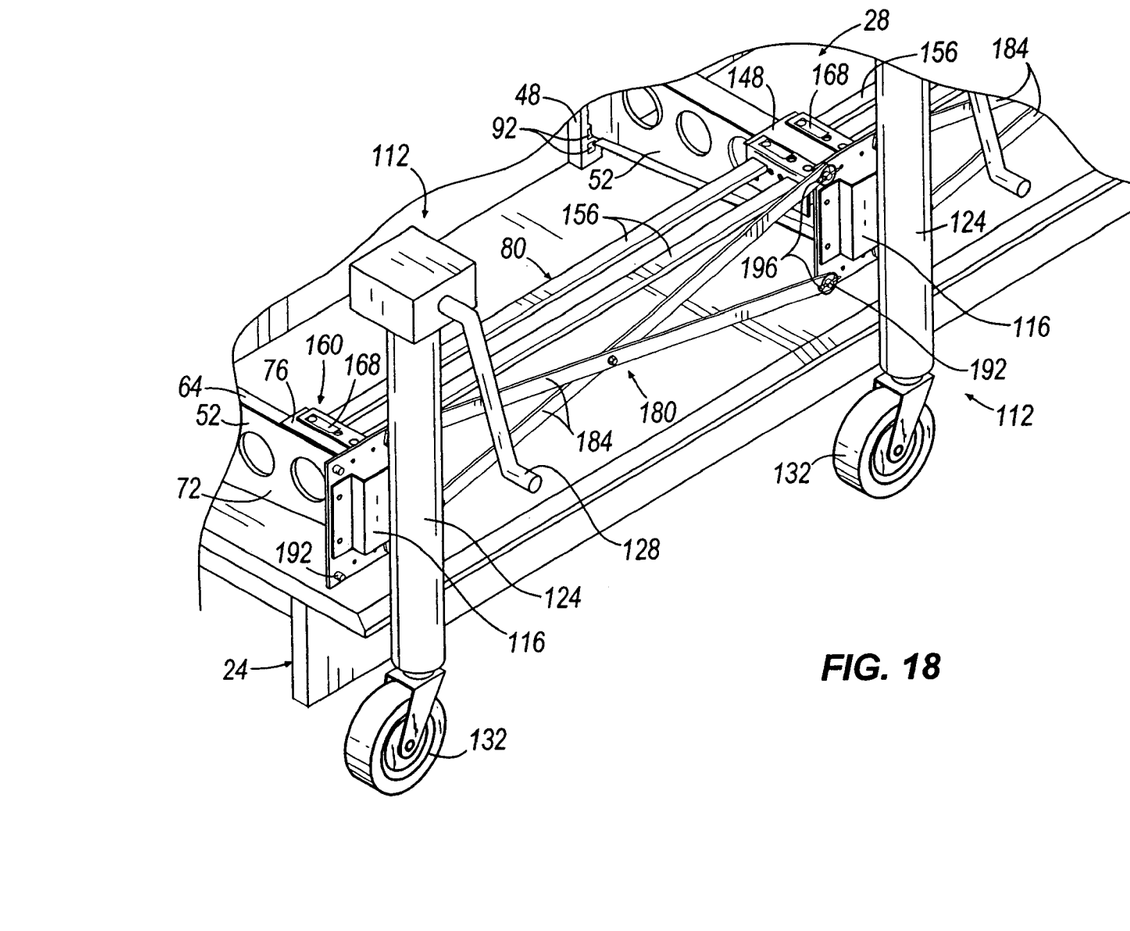
FIG. 18 is a perspective view with portions broken away of the shelving assembly and the moving apparatus shown in FIG. 1.

Referring to FIGS. 1-2 and 18, braces 180 are included in the moving apparatus 20 to increase the structural rigidity of it. Although the braces 180 can be disposed anywhere within the moving apparatus 20, the braces 180 in the embodiment shown are disposed between the support legs 36, 40, 44 and have ends connected to the support legs 36, 40, 44. Any number of braces 180 can be utilized within the moving apparatus 20; however, in the embodiment shown, one brace 180 is positioned between each pair of adjacent support legs 36, 40, 44.

Although the braces 180 can assume any shape and can be made of any appropriate material, the braces 180 in the embodiment shown are made of steel and include a pair of brace cross-members 184 pivotally connected together. The braces 180 can be connected to the support legs 36, 40, 44 in any manner, however, the braces 180 in the embodiment shown have a brace aperture 188 (see FIG. 2) defined through and near each end of the brace cross-members 184 and the support legs 36, 40, 44 include brace projections 192 extending therefrom that are insertable through the brace apertures 188.

The braces 180 are locked to the support legs 36, 40, 44 by inserting locking pins 196 through pin apertures 200 (FIG. 5) defined through the brace projections 192 to trap the braces 180 between the pins 196 and the support legs 36, 40, 44. In the embodiment shown, the locking pins 196 are connected to the support legs 36, 40, 44 via a wire 204 (FIGS. 9 and 10) threaded through the jack-connecting plate 116. A locking pin 196 is connected to each end of the wire 204. Connecting the locking pins 196 to the support legs 36, 40, 44 prevents loss of the locking pins 196 and provides the locking pins 196 in a readily available position when not inserted into the pin apertures 200. Alternatively, the locking pins 196 can be connected to the support legs 36, 40, 44 in other manners or the locking pins 196 may not be interconnected to the support legs 36, 40, 44 and stored in a tool box or storage bin and still be within the spirit and scope of the present invention.

Having focused on the structural components of the moving apparatus 20, connection of the moving apparatus 20 to the shelving assembly 24, moving of the shelving assembly 24, and disconnection of the moving apparatus 20 from the shelving assembly 24 will now be described in greater detail.

With reference to FIGS. 1-2 and 6-7, the support legs 36, 40, 44 are connected to the vertical uprights 48 by inserting the connecting tabs 56 into upright slots 92 defined in the vertical uprights 48 and pulling upward on the support legs 36, 40, 44 until the locking pins 104 are aligned with an appropriate one of the upright slots 92. The spring bias of the locking pins 104 biases the locking pins 104 into the upright slots 92 to lock the support legs 36, 40, 44 to the shelving assembly 24. The location indicators 136 ensure that the support legs 36, 40, 44 are connected to the shelf 24 in the proper locations.

Referring to FIGS. 1-2 and 15-17, the struts 80 are connected to the support legs 36, 40, 44 by inserting the projections 164 of the struts 80 into the strut support slots 172 and moving the struts 80 forward (away from the shelving assembly 24 in a direction substantially parallel to the ground surface) to align the locking tabs 168 with the locking apertures 176 defined in the strut supports 76, 148, 152. The spring-biased locking tabs 168 are inserted into the locking apertures 176 to lock the struts 80 to the support legs 36, 40, 44. As discussed above, each of the left and right support legs 36, 44 include strut supports 76, 152 that extend from one side thereof. Accordingly, the left and right support legs 36, 44 can only support one strut 80 each. The struts 80 supported by the left and right support legs 36, 44 do not extend beyond the flat sides of the left and right support legs 36, 44 and, therefore, interference is limited between the moving apparatus 20 and a shelving assembly next to or abutting the shelving assembly 24 to which the moving apparatus 20 is connected. The center support leg(s) 40 include a strut support 148 that extends from both sides thereof and has two pairs of strut support slots and locking apertures 172, 176 defined therethrough, one pair on each side of the strut support 148. Accordingly, the center support leg 40 is configured to support two struts 80, one on each side thereof.

Referring to FIGS. 1-2 and 18, the braces 180 are connected to the support legs 36, 40, 44 by rotating the brace cross-members 184 relative to one another to form an X-shape and bringing the brace apertures 188 into alignment with the brace projections 192. The braces 180 are then slid onto the brace projections 192 past the pin apertures 200 and the locking pins 196 are inserted through the pin apertures 200 to trap the braces 180 between the support legs 36, 40, 44 and the locking pins 196, thereby locking the braces 180 to the support legs 36, 40, 44.

Figure 19:
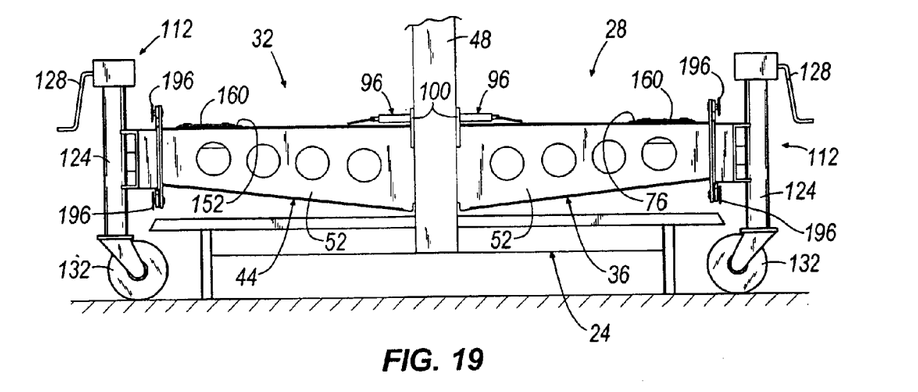
FIG. 19 is a right side view with portions broken away of the shelving assembly of FIG. 1 with the moving apparatus attached and shown in a stationary mode.
Figure 20:
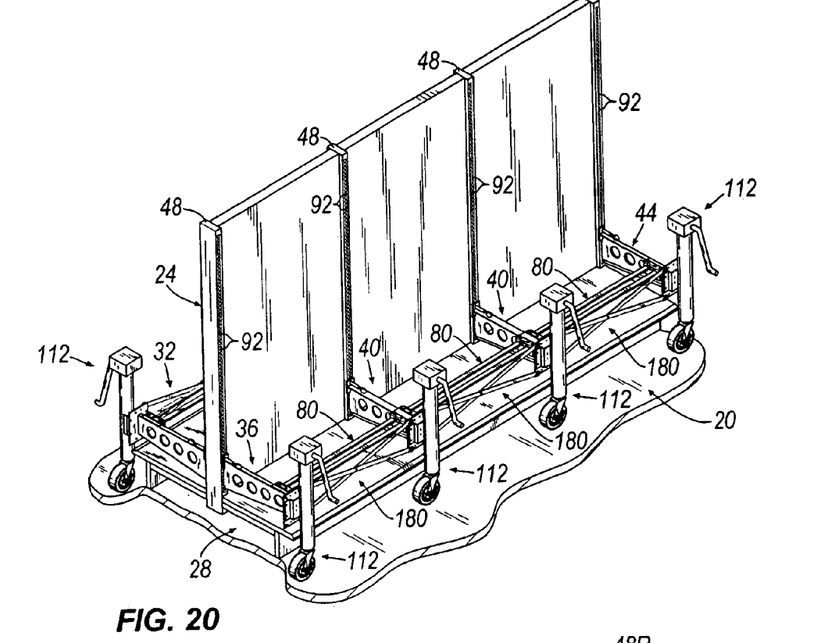
FIG. 20 is a perspective view of the shelving assembly and the moving apparatus of FIG. 1 shown in the stationary mode.

Referring to FIGS. 19 and 20, the shelving assembly 24 is shown with the moving apparatus 20 connected to it. The shelving assembly 24 and moving apparatus 20 are in a stationary mode, in which the shelving assembly 24 is resting on the ground. Attempts to move the shelf 24 while it is in the stationary mode would be difficult, if not impossible, due to the weight of the shelving assembly 24 and the products supported thereon.

Figure 21:
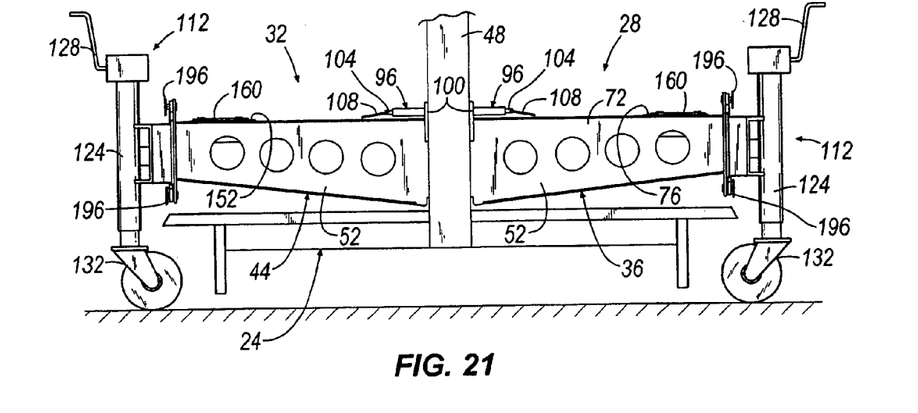
FIG. 21 is a right side view with portions broken away of the shelving assembly and the moving apparatus similar to that shown in FIG. 19, but shown in a moving mode.
Figure 22:
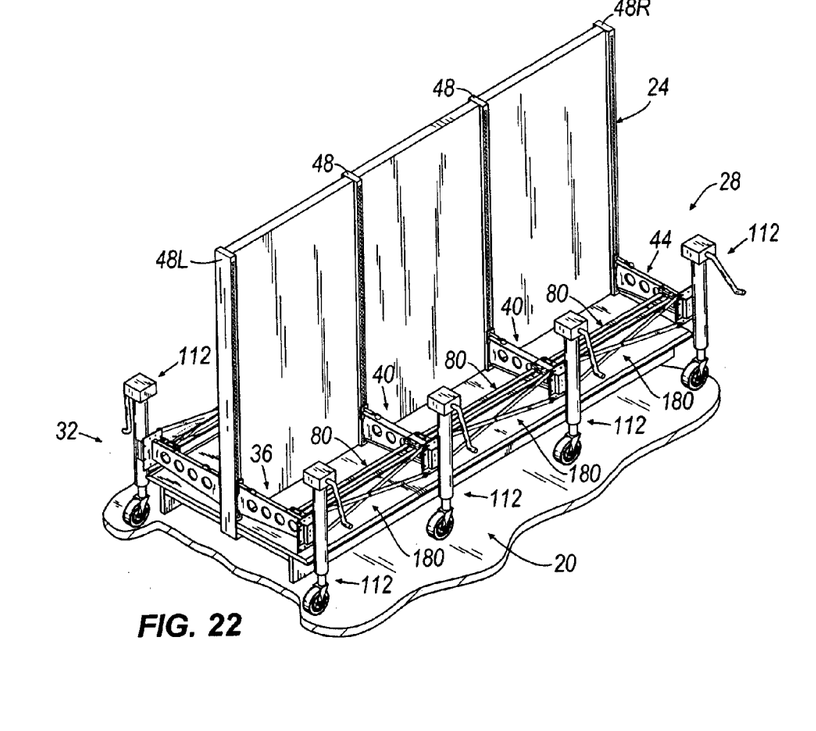
FIG. 22 is a perspective view of the shelving assembly and the moving apparatus of FIG. 1 shown in the moving mode.

Referring to FIGS. 21 and 22, the shelving assembly 24 is shown with the moving apparatus 20 connected it, but in a moving mode, in which the shelving assembly 24 is supported off the ground by the support legs 36, 40, 44. To move the shelving assembly 24 from the stationary mode to the moving mode, the handles 128 are manually rotated in a first direction to move the caster wheels 132 downward and into engagement with the ground (if they are not already engaged with the ground). After the caster wheels 132 engage the ground, further rotation of the handles 128 in the first direction lifts the body portions 52 of the support legs 36, 40, 44 upward away from the ground, thereby moving the shelving assembly 24 upward away from the ground. The shelving assembly 24 and the moving apparatus 20 are in the moving mode when the shelving assembly 24 is off the ground. When in the moving mode, the shelving assembly 24 is vertically supported on the support legs 36, 40, 44. The shelving assembly 24 is movable in any direction by pushing, pulling or otherwise moving the shelving assembly 24 and moving apparatus 20. The moving apparatus 20 moves or rolls over the ground on the caster wheels 132.

To lower the shelving assembly 24 and the moving apparatus 20 back to the stationary mode, the handles 128 are rotated in a second direction, opposite to the first direction, until the shelving assembly 24 rests on the ground. The moving apparatus 20 is disconnected from the shelving assembly 24 in the stationary mode by removing the braces 180, the struts 80, and the support legs 36, 40, 44. The braces 180 are removed by pulling the locking pins 196 from the pin apertures 200 and pulling the braces 180 off of the brace projections 192. The struts 80 are removed by pulling the locking tabs 168 upward against their biasing force and out of the locking apertures 176. After the locking tabs 168 are taken out of the locking apertures 176, the struts 80 are moved rearward (toward the vertical uprights 48 of the shelf 24 in a direction substantially parallel to the ground) and lifted upward to remove the projections 164 of the strut 80 from the strut support slots 172. The support legs 36, 40, 44 are removed by pulling the lanyards 108 away from the shelf 24 to disengage the locking pins 104 of the locking assemblies 96 from the respective upright slots 92. Once the locking pins 104 are disengaged from the vertical uprights 48, the connecting tabs 56 can be moved downward to disengage the uprights 48 and be removed from the upright slots 92, thereby removing the support legs 36, 40, 44 from the shelving assembly 24.

It should be understood that the moving apparatus 20 can be assembled and disassembled from the shelving assembly 24 in any manner and the components of the moving apparatus 20 can be assembled and disassembled in any order. It should also be understood that the moving apparatus 20 can be permanently connected to the shelving assembly 24 and does not require assembling for moving and disassembling after moving. It should further be understood that the moving apparatus 20 can be integrally formed with the shelving assembly 24. Also, the various components of the moving apparatus 20 can be connected to each other prior to attaching them to the shelving assembly 24 or they can be connected to each other as the moving apparatus 20 is being attached to the shelving assembly 24, as shown in the Figures. For example, the braces 180 and/or struts 80 can be permanently connected or integrally formed with the support legs 36, 40, 44. Such permanent connection or integral forming would reduce the assembly and disassembly steps.

It should further be understood that the moving apparatus 20 does not require struts 80 and braces 180 and may only include support legs 36, 40, 44. In such instances, the support legs 36, 40, 44 alone have enough structural rigidity to support the shelving assembly 24 during moving operations. In the embodiment shown, a support leg 36, 40, 44 is connected to each vertical upright 48 of the shelf 24. However, support legs 36, 40, 44 do not have to be connected to each vertical upright 48. Accordingly, the struts 80 and braces 180 could be appropriately sized to span between the support legs 36, 40, 44. In some embodiments, for example, the support legs 36, 40, 44 may be connected to alternating vertical uprights 48. In further embodiments, support legs 36, 40, 44 may be connected only to the right and left end vertical uprights 48R, 48L.

Further, support legs 36, 40, 44 are connected to both the front and rear of the vertical uprights 48. It should also be understood that support legs 36, 40, 44 do not have to be connected to both the front and the rear of the same vertical upright 48. In some embodiments, a support leg 36, 40, 44 may be connected to only one of the front and rear sides of a vertical upright 48. In other embodiments, a support leg 36, 40, 44 may be connected to neither the front nor the rear sides of a vertical upright 48.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A moving apparatus for moving a shelving assembly having a vertical upright, the moving apparatus comprising:
   a support leg connectable to the shelving assembly, the support leg comprising
      a first portion releasably engagable with the vertical upright of the shelving assembly,
      a second portion, and
      a jack coupled to the second portion of the support leg, the jack actuatable to raise the shelving assembly relative to a support surface; and
   a fastener coupled to the support leg, the fastener movable with respect to the support leg to and from a position in which the fastener is releasably engaged with the vertical upright,
   wherein the jack is operable to raise and lower the first portion with respect to the support surface, and the first portion is retained against disengagement from the vertical upright responsive to being raised by the jack.

2. The moving apparatus as claimed in claim 1, wherein the support leg is releasably engagable with the vertical upright at an end of the support leg opposite the jack.

3. The moving apparatus as claimed in claim 1, wherein the first portion has at least one projection received within an aperture in the vertical upright.

4. The moving apparatus as claimed in claim 3, wherein the at least one projection comprises a recess in which a portion of the vertical upright is removably received.

5. The moving apparatus as claimed in claim 3, wherein the at least one projection is generally hook-shaped.

6. The moving apparatus as claimed in claim 1, wherein the fastener is slidably mounted upon the support leg.

7. The moving apparatus as claimed in claim 1, wherein the fastener is biased toward engagement with the vertical upright.

8. The moving apparatus as claimed in claim 1, further comprising at least one of a wheel and a caster coupled to the jack.

9. The moving apparatus as claimed in claim 1, wherein the jack is actuatable to a first height in which the support leg is releasably engagable with the vertical upright and a second height in which the fastener engages the vertical upright to secure the support leg against disengagement from the vertical upright.

10. The moving apparatus as claimed in claim 9, wherein the fastener automatically engages the vertical upright at the second height of the jack.

11. A moving apparatus for moving a shelving assembly having a vertical upright, the moving apparatus comprising:
   a support leg connectable to the shelving assembly, the support leg comprising
      a body having a connector releasably engagable with the vertical upright of the shelving assembly; and
      a jack assembly coupled to the body and adapted to raise and lower the shelving assembly relative to a support surface, the jack assembly adjustable to a first height in which the connector is releasably engaged with the vertical upright of the shelving assembly and to a second height having a higher elevation than the first height and in which the connector is secured against disengagement from the vertical upright; a fastener on the body, the fastener movable with respect to the body between a first position in which the fastener is engaged with the vertical upright and second position in which the fastener is disengaged from the vertical upright.

12. The moving apparatus as claimed in claim 11, wherein the fastener is biased toward engagement with the vertical upright.

13. The moving apparatus as claimed in claim 11, wherein the connector is a projection shaped and dimensioned to be freely inserted into and removed from an aperture of the vertical upright when the jack assembly is at the first height.

14. The moving apparatus as claimed in claim 13, wherein the connector comprises a recess in which a portion of the vertical upright is received when the jack assembly is at the second height.

15. The moving apparatus as claimed in claim 14, wherein the connector is substantially hook-shaped.

* * * * *